Charles R. Woods
INVENTOR.

Jan. 7, 1958  C. R. WOODS  2,818,814
POWER PLANT AND CONNECTOR FOR DEEP WELL PUMPS
Filed Nov. 8, 1954  3 Sheets-Sheet 2

Charles R. Woods
INVENTOR.
BY
Attorneys

Jan. 7, 1958 C. R. WOODS 2,818,814
POWER PLANT AND CONNECTOR FOR DEEP WELL PUMPS
Filed Nov. 8, 1954 3 Sheets-Sheet 3

Charles R. Woods
INVENTOR.

BY
Attorneys

United States Patent Office 2,818,814
Patented Jan. 7, 1958

2,818,814

POWER PLANT AND CONNECTOR FOR DEEP WELL PUMPS

Charles R. Woods, San Antonio, Tex.

Application November 8, 1954, Serial No. 467,531

4 Claims. (Cl. 103—87)

This invention relates generally to mechanism for powering deep well pumps and pertains more particularly to a specific power plant and a connector to be utilized with the specific power plant or with other conventional power plants for driving deep well pumps in a more expeditious manner.

A primary object of this invention is to provide a connector which permits either a particular power plant to be so connected with the pump shaft of a deep well pump so as to be in a direct alignment therewith, obviating the necessity of expensive and complicated gear housing and gear drive assemblies which are ordinarily necessitated for driving a vertical deep well pump shaft by means of a conventional internal combustion engine.

Another object of this invention is to provide an improved form of connector for establishing a drive between an internal combustion engine and the deep well pump shaft which permits ready and rapid attachment and detachment between the power plant and the pump shaft.

Still another object of this invention is to provide a connector assembly in conformity with the foregoing object wherein the connection between the crankshaft of the internal combustion engine and the vertical pump shaft of a deep well pump is so effected as to inherently permit rapid and easy adjustment of the longitudinal positioning of the pump shaft whereby a proper running clearance in operative relationship may be effected between the pump rotors and stators.

A further object of this invention is to provide an improved mechanism for establishing connection directly between a vertical deep well pump shaft and the crankshaft of an internal combustion engine and to simultaneously provide an oil sump for containing the normal quantity of oil required for lubricating purposes for the internal combustion engine.

A still further object of this invention resides in the provision of improvements in a connector between an internal combustion engine and a vertical deep well pump shaft wherein the connection is simply yet effectively made and wherein the connector includes a housing portion which forms simultaneously an oil sump for the internal combustion engine and wherein the connecting means effectively seals the housing to prevent loss of lubricating oil during normal operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
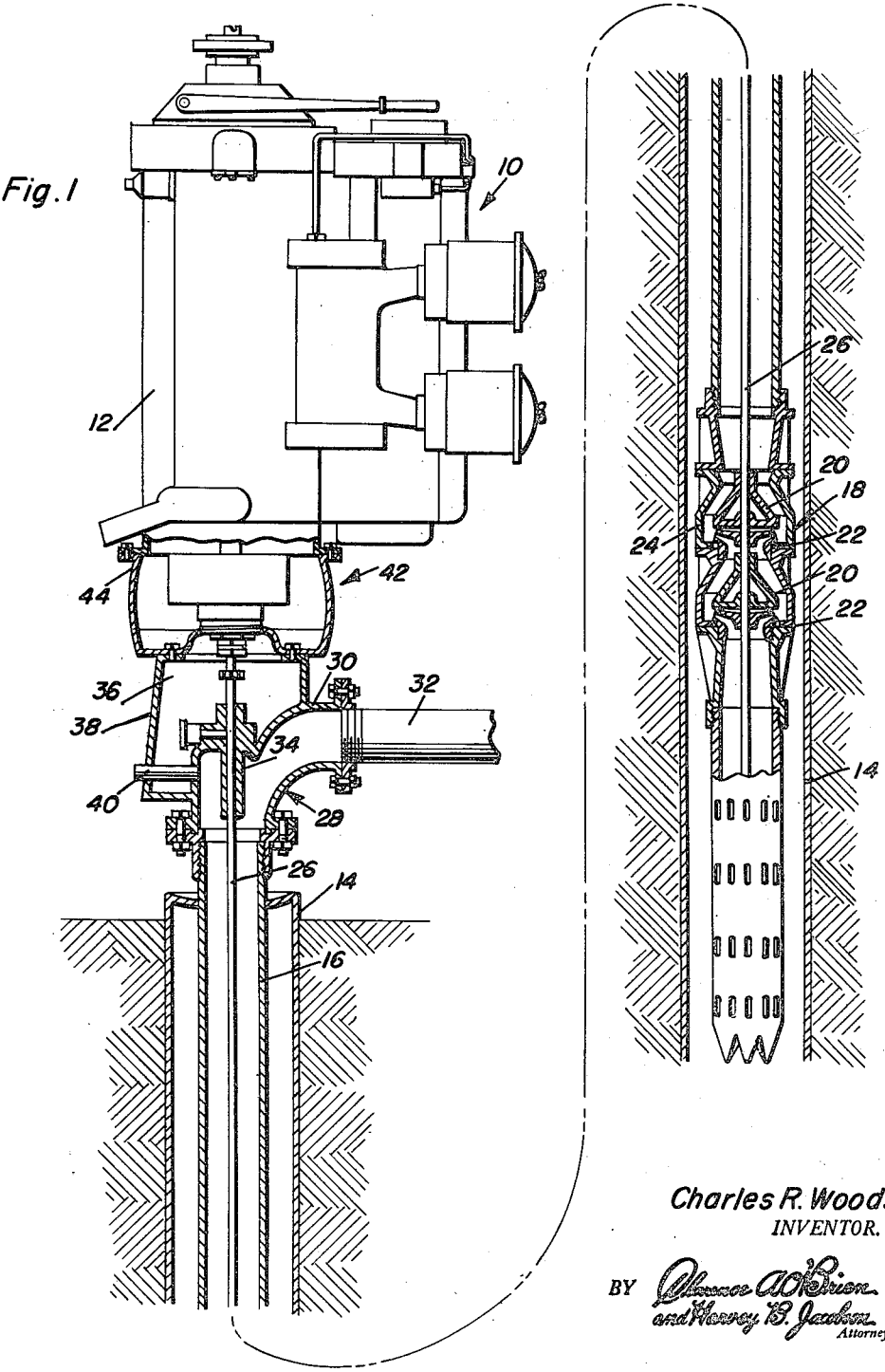
Figure 1 is a vertical section partly in section showing the operative relationship existing between the internal combustion engine, the connector assembly, and a portion of the deep well pump shaft assembly.

Referring now more particularly to the drawings, and at this point to Figures 1–4, the reference numeral 10 indicates generally a conventional internal combustion engine of any desired type which is of sufficient power capabilities of providing a proper drive to the deep well pump hereinafter described. The details of the engine 10 being entirely conventional in nature, form no part of this invention and further discussion of the specific details of this invention is believed to be unnecessary. However, the engine may be provided with a replacement oil pan 12 which replaces the usual oil pump utilized on such engines and which includes a deep sump portion for retaining the normal supply of engine oil therein. Since the internal combustion engine is arranged vertically, other means are provided for normally retaining the supply of oil.

The reference numeral 14 indicates a well casing of any conventional character and the reference numeral 16 indicates pipe of conventional nature to the lower end of which, as will be seen most clearly from the right hand portion of Figure 1, is secured the deep well pump assembly 18.

It is to be understood that the deep well pump assembly 18 is of entirely conventional nature and includes impeller members 20 and stator members 22, the latter mounted rigidly with the outer casing portion 24 and the former rigidly secured to the pump drive shaft 26, as will be readily apparent.

The upper end of the pipe line 16 is connected by any suitable mechanism to a casing assembly 28, a portion 30 of which forms a discharge from the pump and is to be connected to a discharge pipe line 32 and a portion 34 of which forms a journal for the upper end of the pump shaft 26. The upper section of the casing 28 includes a chamber 36 which is isolated from that portion of the casing through which the fluid moved by the pump flows, the main wall 38 of the casing forming this chamber in the manner illustrated. At this point, it is to be noted that the chamber 36 may be provided with a hand hole or opening in the wall 38 such as to permit ready adjustment of certain mechanism hereinafter described.

The casing assembly 28 may also includes an auxiliary discharge line 40 so that fluid flowing through the pipe line 16 may be connected to a suitable heat exchanger for cooling the internal combustion engine 10 when the fluid is water. However, it is to be noted that the mechanism herein described is not to be limited to pumps operating only upon water as a working fluid, it being realized that the same is readily adaptable for use in oil wells, for various pumping installations such as for loading and unloading barges, with ships in general and the like.

The connector assembly is indicated generally by the reference character 42 and is that part which forms the departure from the conventional and which constitutes the subject matter of this invention. The connector includes a casing or housing member 44, the housing 44 will be seen to be generally of dished construction and will be seen to have an opening in its bottom wall 46 within which an oil seal sleeve 48 is firmly affixed. The central portion of the bottom wall may be upwardly deformed as shown such that the oil seal sleeve 48 may be of relatively small longitudinal dimension, although it is to be understood that the bottom wall may be entirely flat or substantially so and that the oil seal sleeve 48 may be considerably longer than that shown. In any event, it is necessary that the oil seal sleeve 48 extends a substantial vertical distance above the normal level of oil, which will be received in the housing 44, which forms the sump for the internal combustion engine 10. In this respect, it is to be noted that the oil at its normal level is indicated by the reference character 50 in Figure 2.

Figure 2:
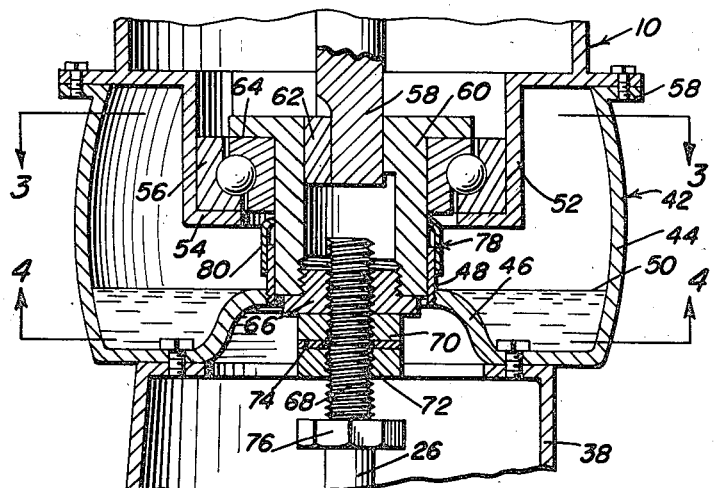
Figure 2 is an enlarged sectional view taken through the connector assembly and portions of the internal combustion engine and the pump casing assembly.
Figure 3:
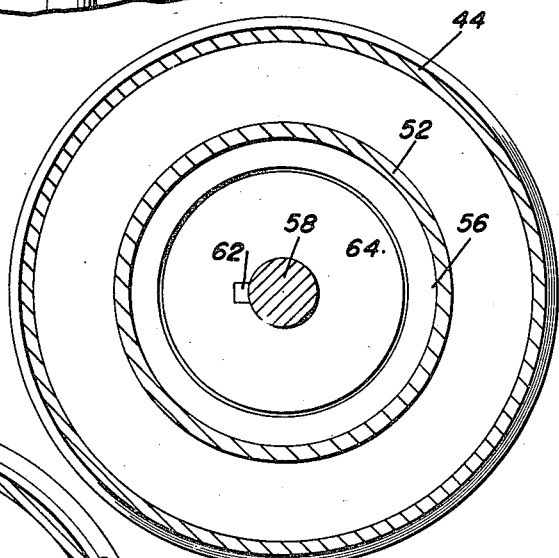
Figure 3 is a horizontal section taken substantially along the plane of section line 3—3 in Figure 2.
Figure 4:
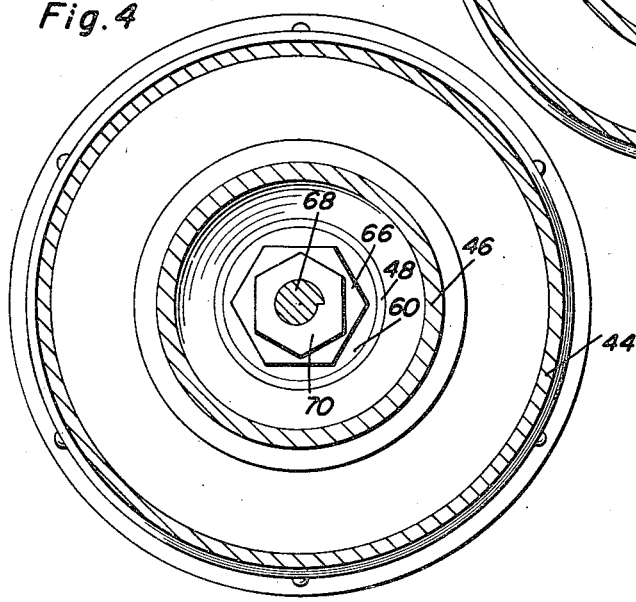
Figure 4 is a horizontal section taken substantially along the plane of section line 4—4 in Figure 2.

The housing 44 also includes an air section 52 of cylindrical configuration which terminates at its lower end in an inwardly directed radial flange 54 forming a seat for a thrust bearing member 56. At the upper end of the housing 44, ears or a peripheral flange 58 is provided for a purpose of attaching the same to the internal combustion engine 10. In this respect, it is to be noted that the specific configuration of the internal combustion engine block to which the housing 44 is attached, as shown specifically in Figure 2, is not intended to be restrictive insofar as this invention is concerned. Further in this respect, it is to be noted that the details of the internal combustion engine as shown in Figure 2 are entirely diagrammatic and do not necessarily illustrate the exact construction of any internal combustion engine, it being merely necessary to relate that the shaft member 58 which projects from the forward end of the engine block is intended to illustrate the forward end of the engine crankshaft. This end of the crankshaft normally projects into the timing gear cover case and outwardly therefrom to be provided at its free end with a pulley which normally drives a fan for cooling the engine. However, in this instance, the fan assembly is discarded as is the pulley for driving the same and a connector sleeve 60 is slidably but non-rotatably affixed to the free end of the crankshaft and forms a continuation thereof as by a key connection 62 or any other suitable means, as may be desired. The sliding connection between the crankshaft and the sleeve is necessary so that no thrust from the sump will be imparted to the main bearing thrust flange of the engine. The sleeve 60 is provided with an annular shoulder 64 which overlies the thrust bearing member 56, that is the inner race thereof. It is to be noted that the thrust bearing 56 is provided for the purpose of receiving the thrust occasioned by the rotation of the deep well pump assembly 18 and it is to be understood that the thrust bearing is of sufficient capacity as to provide proper support for the thrust of the pump.

The lower or free end of the connector sleeve 60 is internally threaded and receives an externally threaded plug member 66 therein. The plug member has an internally threaded bore therethrough which engages with the threaded free or upper end 68 of the pump drive shaft 26. A pair of lock nut members 70 and 72 and an intervening lock washer 74 are engaged with each other and with the plug 66 for securely locking the pump drive shaft 26 to the plug and consequently to the connector sleeve 60, as will be readily apparent. Adjacent the upper end of the pump drive shaft 26 is a hexagonal shoulder 76 for the purpose of adjusting the pump drive shaft 26 longitudinally with respect to the connector sleeve 60 to provide proper clearance between the pump impellers and stators and effect the optimum clearances in the pump assembly. To effect this adjustment, the previously described hand hole or opening in the housing 38 permits the lock nuts 70 and 72 to be backed off such that manipulation of the hexagonal shoulder 76 can be accomplished, rotating the pump drive shaft 26 in the desired direction and effecting longitudinal adjustment of the pump drive shaft 26. It is to be noted that the threads of the pump drive shaft portion 68 and the plug 66 are such that rotation of the engine to drive the pump will effect a tightening of the threads against the plug member and of the plug member against the connector sleeve 60 as well as the lock nuts 70 and 72, obviating the possibility of these parts from becoming loosened as the pump is driven.

To effect the most desirable oil seal assembly with the oil sealing sleeve 48, the connector sleeve 60 is provided with an oil slinger member 78 which includes a peripheral wall portion 80 which surrounds and lies closely adjacent to an upper end portion of the oil sealing sleeve 48. In this manner, it will be clear that since the lower end of the connector sleeve 60 is received within the oil seal sleeve 48 with little clearance therebetween and since the slinger 78 overlies the outer portion of the upper end of the sleeve 48, an effective oil seal is provided.

Figure 5:
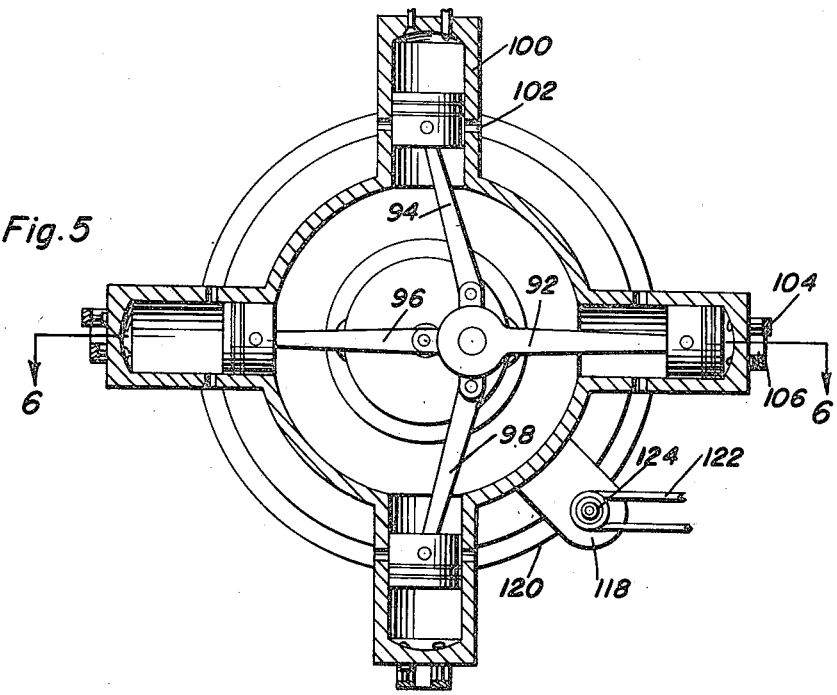
Figure 5 is a sectional view taken through an improved form of radial diesel engine particularly adapted for use in driving deep well pumps.
Figure 6:
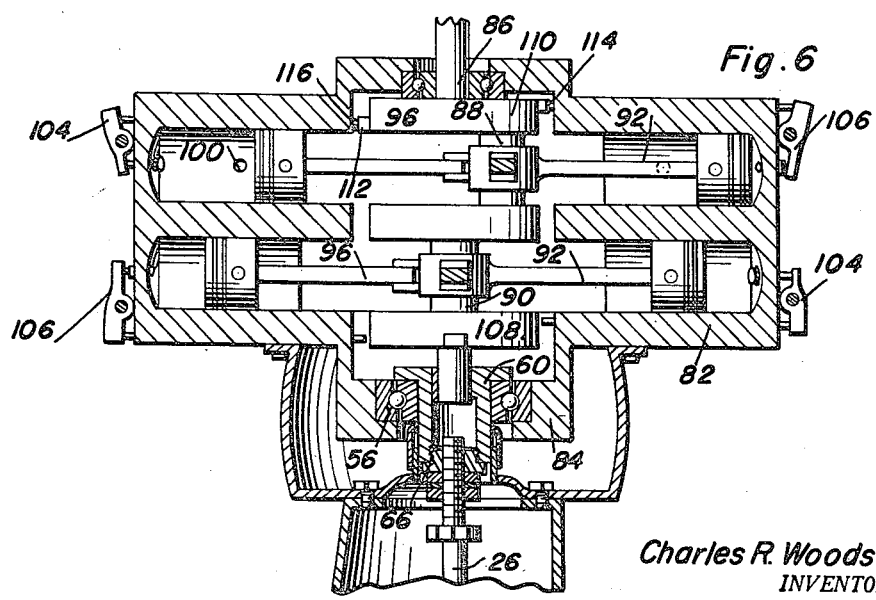
Figure 6 is a vertical section taken substantially along the plane of section line 6—6 in Figure 5.

Referring now more particularly to Figures 5 and 6, a preferred form of internal combustion engine for use with the vertical drive for the deep well pump is shown. As will be seen, the block 82 of this engine is so formed that the connector housing 84 is integral therewith.

The thrust bearing 56, connector sleeve 60, plug 66, pump shaft 26 and associated mechanism remain the same as that previously described. The engine proper includes a double-throw crankshaft 86 upon which two journals 88 and 90 are formed, each journal having four connecting rods operatively associated therewith. The connecting rods include a master connecting rod 92 and auxiliary rods 94, 96, and 98 connected to the master rod as will be clearly seen in Figure 5. The engine itself is of the two stroke cycle type with the cylinders 100 being provided with exhaust port passages 102 which are connected to a suitable manifold, not shown. A pair of rocker arms 104 and 106 are provided for operating an intake valve and a fuel ejector respectively. A conventional supercharger is associated with an intake manifold and with the intake valve ports in a conventional manner.

For the purpose of operating the push rods which actuate the rocker arms 104 and 106, the crankshaft is provided with cheek members 108 and 110 at opposite ends thereof which are provided with external ramps 112 and 114 or cam surfaces which bear against the lower ends of the push rods 116 as shown. In this manner, a very simple valve train mechanism is effected, one which will not readily become out of order or will be subject to undue wear or breakage.

A supercharger is indicated by the reference character 118 and an intake manifold 120 is diagrammatically shown associated therewith, the supercharger being driven by means of a belt 122 and pulley 124 by any suitable connection with the crankshaft 186 of the engine. The purpose of the combustion engine shown is to obtain a maximum efficiency with a minimum of working parts and consequently a minimum of necessary maintenance.

A ratchet assembly such as is conventionally used in pump drives may be utilized, the ratchet would be housed within the flywheel housing at the upper end of the engine as shown in Figure 1, the purpose of such ratchets being to prevent reverse rotation of the pump when the engine is shut down such as would normally be occasioned by the column of water above the pump.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination with a vertical deep well pump shaft, an internal combustion engine including a crankshaft aligned with said pump shaft, and an adapter for directly connecting said crankshaft to said pump shaft, said adapter comprising a dished housing having an opening in its bottom wall and forming an oil sump for said internal combustion engine, an oil seal sleeve secured to said housing at said opening and projecting upwardly thereshafts, and a connector sleeve associated with said seal sleeve and secured to said crankshaft and said pump shaft so as to connect the shafts for common rotation.

2. In combination with a vertical deep well pump shaft, an internal combustion engine including a crankshaft aligned with said pump shaft, and an adapter for directly connecting said crankshaft to said pump shaft, said adapter comprising a dished housing having an opening in its bottom wall and forming an oil sump for said internal combustion engine, an oil seal sleeve secured to said housing at said opening and projecting upwardly therefrom into said housing in concentric alignment with said shafts, a connector sleeve secured to said crankshaft and said pump shaft so as to connect the shafts for common rotation, and an oil slinger secured to said connector sleeve having a peripheral wall portion enclosing the upper end of said oil seal sleeve.

3. In combination with a vertical deep well pump shaft, an internal combustion engine including a crankshaft aligned with said pump shaft, and an adapter for directly connecting said crankshaft to said pump shaft, said adapter comprising a dished housing having an opening in its bottom wall concentrically disposed with respect to said shafts, said adapter also including a stepped top wall portion provided with a bottom wall opening aligned with the first mentioned opening, a connector sleeve keyed to said crankshaft and projecting therefrom through the adapter openings, a thrust bearing seated in the stepped portion of said top wall, said sleeve having an annular shoulder overlying said bearing, the upper end of said well pump shaft being threaded, a connector plug engaged upon the upper end of said pump shaft and within the lower end of said connector sleeve.

4. In combination with a vertical deep well pump shaft, an internal combustion engine including a crankshaft aligned with said pump shaft, and an adapter for directly connecting said crankshaft to said pump shaft, said adapter comprising a dished housing having an opening in its bottom wall concentrically disposed with respect to said shafts, said adapter also including a stepped top wall portion provided with a bottom wall opening aligned with the first mentioned opening, a connector sleeve keyed to said crankshaft and projecting therefrom through the adapter openings, a thrust bearing seated in the stepped portion of said top wall, said sleeve having an annular shoulder overlying said bearing, the upper end of said well pump shaft being threaded, a connector plug engaged upon the upper end of said pump shaft and within the lower end of said connector sleeve, an oil seal sleeve secured to the adapter at the first mentioned opening and projecting upwardly therefrom in surrounding relation to said sleeve, and an oil slinger secured to said sleeve and including a depending peripheral wall portion enclosing the upper end of said oil slinger sleeve.

References Cited in the file of this patent

UNITED STATES PATENTS

| | | |
|---|---|---|
| 1,528,449 | Meyer | Mar. 3, 1925 |
| 1,764,263 | Johnson | June 17, 1930 |
| 1,832,620 | Cook et al. | Nov. 17, 1931 |
| 2,435,470 | Samelson | Feb. 3, 1948 |
| 2,578,875 | Angle | Dec. 18, 1951 |
| 2,630,105 | Hasbrouch et al. | Mar. 3, 1953 |